United States Patent [19]

Wuthrich

[11] Patent Number: 5,326,072

[45] Date of Patent: Jul. 5, 1994

[54] PLUG-IN SAFETY COUPLING, IN PARTICULAR FOR COMPRESSED AIR LINES

[75] Inventor: Albrecht Wuthrich, Wolhusen, Switzerland

[73] Assignee: Hans Oetiker AG, Maschinen-und Apparatefabrik, Switzerland

[21] Appl. No.: 896,092

[22] Filed: Jun. 8, 1992

Related U.S. Application Data

[63] Continuation-in-part of Ser. No. 423,394, filed as PCT/CH89/00014, Jan. 24, 1989, abandoned.

[30] Foreign Application Priority Data

Feb. 3, 1988 [CH] Switzerland ............... 377/88-9

[51] Int. Cl.$^5$ ............................................. F16L 37/28
[52] U.S. Cl. .......................... 251/149.2; 251/149.9; 137/616.7
[58] Field of Search ............... 251/149.2, 149.9, 208; 137/616.7

[56] References Cited

U.S. PATENT DOCUMENTS 2,015,396  9/1935  Drissner ..................... 137/616.7
4,662,396  5/1987  Avnon ........................ 137/616.7

FOREIGN PATENT DOCUMENTS 2028653  9/1970  France ................. 137/616.7
2068039  8/1971  France ................. 137/616.7
 638959  6/1950  United Kingdom ..... 137/616.7
1503647  3/1978  United Kingdom ..... 137/616.7

*Primary Examiner*—Martin P. Schwadron
*Assistant Examiner*—Kevin L. Lee
*Attorney, Agent, or Firm*—Speckman, Pauley & Fejer

[57] ABSTRACT

A plug-type safety coupling for pressures lines comprising a plug, a housing comprising a one-piece shaped part, a blocking element sealably mounted and secured within the housing, the blocking element being rotatable between a blocking position and a working position and having one of a cylindrical and a slightly conical shape. The blocking element is provided with a bore, which bore forms a bush for the plug, the bush comprising two sequential axial borings having different diameters. The material surrounding the smaller diameter axial boring forms an annular groove in communication with the larger diameter axial boring, the annular groove adapted to sealingly accommodate the plug, a seal between the plug and the bush being disposed between an outer surface of a nipple enclosed by the annular groove and an inner side surface of the plug. The blocking element is sealed against the housing by a loop seal disposed within a groove in the surface of the blocking element or a groove disposed in the inner surface of the housing.

23 Claims, 5 Drawing Sheets

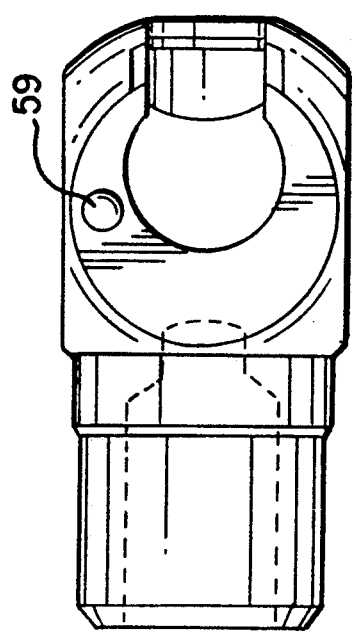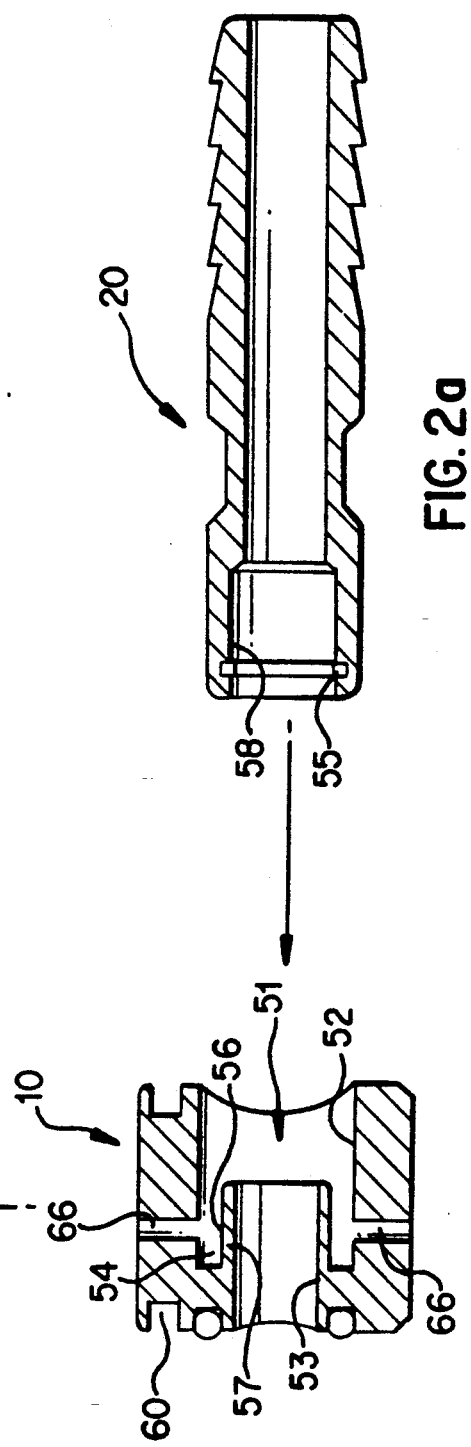

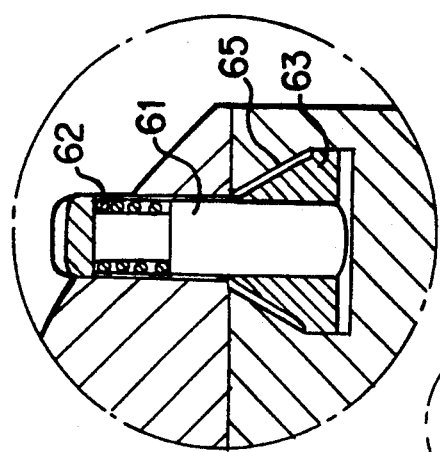
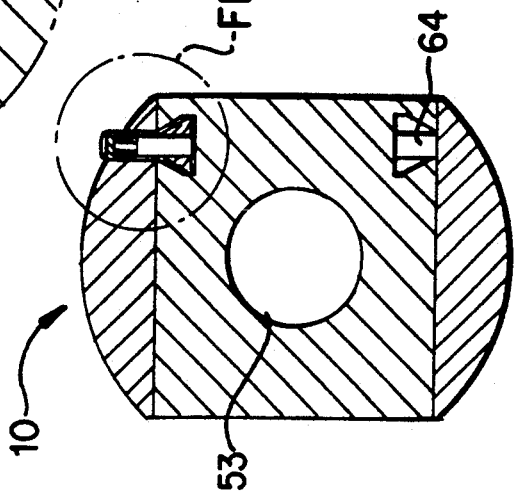
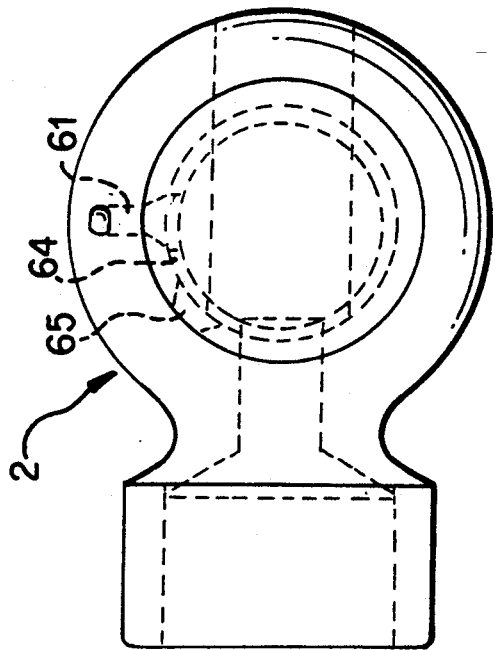

PLUG-IN SAFETY COUPLING, IN PARTICULAR FOR COMPRESSED AIR LINES

This is a continuation-in-part patent application of my co-pending patent application Ser. No. 07/423,394, filed as PCT/CH89/00014, Jan. 24, 1989, now abandoned.

BACKGROUND OF THE INVENTION

1. Field of the Invention

This invention relates to a plug-type safety coupling for lines carrying high pressure media, said coupling having a coupling barrel with a locking element in its interior. The locking element is brought from a locking position to a working position or vice versa from a working position to a locking position by rotating it. The coupling may be used in lines handling compressible and non-compressible fluid media.

2. Description of the Prior Art

Plug-type security couplings are known in numerous variations and are commercially available, most such couplings having numerous individual components arranged axially, one behind the other, with respect to the line that is to be coupled and moveable in the direction of the axis. The operation of such plug-type couplings includes two elements that are functionally coupled: 1) the securing or blocking and un-blocking of the plug in the coupling barrel, and 2) the opening or closing of a valve that acts in an axially direction.

Despite costly solutions involving the most varied and complex components, known plug-type safety couplings still have dangerous aspects and are somewhat less than user-friendly. In many safety couplings, the plug is only locked in the coupling barrel once the blocking element has already opened, either partially or completely.

Thus, at that point the plug can be forcibly ejected from the coupling barrel.

In known safety couplings the operation of the plug-type coupling must be effected against the pressure exerted by the pressure media to be conveyed in order to move the blocking element in an axial direction and thus release or unblock the lines. Pressure lines having a large internal diameter can barely be coupled in this way at normal working pressures of 5 to 10 bar. The same is true for lines at corresponding negative pressures or vacuums. In these cases, one uses blocking valves which are disposed on both sides of the coupling and which remain independent of such coupling so that the coupling procedure its self is carried out when there is no pressure. In most cases, these blocking valves are automatic valves, mostly one-way valves. However, such valves limit the free flow of the medium to a considerable extent. For this reason, it is understandable that the pressure loss produced by such safety couplings can restrict the operation of the apparatuses and equipment which are to be operated and which are located at the end of the line.

In many compressed air couplings, a particularly dangerous situation occurs during the uncoupling procedure. In normal couplings, the line is blocked only shortly after the plug has been unlocked. If the line is not held with the plug securely in the hand, the plug can be forcibly ejected from the coupling by compressed air forces acting on it. Even in those cases in which, during the uncoupling procedure, the blocking element or the valve is closed and the unlocking is effected thereafter, the pressure of the compressed air which still remains in the uncoupled line cannot drop and the plug will be forcibly ejected from the coupling barrel.

Various proposals have been made in the past to solve these problems. The most elegant of these proposals incorporates a plug-type safety coupling that has, on one side, a plug which incorporates an enclosing, square cross-section bead, and, on the other side, a coupling barrel which is built up from a multi-part housing, in the interior of which is disposed a spherical blocking element to accommodate the plug. The blocking element is designed to be rotatable. The spherical blocking element has a continuous bore into which the plug can be inserted. The spherical blocking element can be pivoted into the operating position by a rotating movement of the plug which has been inserted. The plug is then secured in the housing in this working position by its bead and, thus, is secured against accidental withdrawal or against falling out. Rotation in the opposite direction moves the spherical blocking element into a locking position, the opening of the continuous bore passing over a release port through which any air which is still under pressure and remaining in the plug can escape, after which the plug can be withdrawn from the spherical blocking element in an unpressurized state. Because the blocking element in these couplings is a sphere or a ball, the housing of the coupling barrel must of necessity consist of a plurality of parts in order that the spherical blocking element can be sealed therein. In one embodiment, the housing consists of two halves having appropriately concave inner surfaces sealed together around the spherical blocking element. Connection of the two halves is effected by riveting.

In another embodiment, the housing consists of a shaped part in the interior of which the spherical blocking element is held by parts which are screwed into the shaped part. At one end, these parts are provided with a sealing element having a concave outer side which presses against the spherical blocking element. As previously discussed, the use of a sphere or a ball as a blocking element in these couplings requires that the housing of the coupling barrel be built from a plurality of parts. As a result, fabrication of this coupling involves a great deal of work and is correspondingly costly. The individual parts are relatively intricate and accordingly are costly to produce, and the assembly of the finished coupling involves a great deal of costly assembly labor due to the plurality of parts. In addition, from a technical point of view, supporting a sphere or ball against a seal is difficult. As a result, these known couplings have a tendency to leak under high pressures.

SUMMARY OF THE INVENTION

It is an object of this invention to provide a plug-type safety coupling having a simple design which is thus simple to produce and which works at high pressures without leaking.

It is another object of this invention to provide a plug-type safety coupling which is easily operable even at high pressures, the force required for removing said coupling being substantially reduced compared to known couplings.

It is yet another object of this invention to provide a plug-type safety coupling having a one piece housing which can be cut fully out of a steel rod by a machine requiring no human labor and which, thus, requires no mounting.

It is yet another object of this invention to provide a plug-type safety coupling which can be disconnected under pressureless conditions.

These and other objects of this invention are achieved by a plug-type coupling for pressure lines in accordance with one embodiment of this invention comprising a plug, a coupling barrel having a housing, and a blocking element sealably mounted and secured within the housing, the blocking element being rotatable between a blocking position and a working position. The housing of the coupling barrel comprises a one piece shaped part which can be screwed onto a pressure line end piece. The blocking element has either a cylindrical or slightly conical shape and is provided with a straight line or curved bore passing through it. The bore forms a bush, or sleeve, for the plug, the bush comprising two sequential axial borings with different diameters. The material surrounding the smaller diameter axial boring forms an annular groove around the smaller diameter axial boring which annular groove is in communication with the larger diameter axial boring such that the plug sealably fits into the annular groove. Sealing between the plug and the bush is provided between the outer surface of the end piece, or nipple, enclosed by the annular groove and the inner side surface of the plug. In this manner, the force required to unbolt the plug so that it may be swiveled and pulled out of the bush after swiveling is considerably reduced. To unbolt the plug, the plug is pushed slightly into the bush, thereby releasing the plug. The force for pushing the plug into the bush on a coupling at a given pressure is reduced up to 50%, depending on the diameter and size of the coupling. An additional advantage of this arrangement is that the seal, disposed in the inner side of the plug, is protected compared to known couplings in which sealing is formed is by an outer side of the plug which is easily subject to damage. The blocking element is sealed against the housing by a loop seal having at least one loop, the loop seal being disposed within a corresponding groove in either the surface of the blocking element or the inner surface of the housing.

BRIEF DESCRIPTION OF THE DRAWINGS

These and other features of this invention will be better understood from the following detailed description in conjunction with the accompanying drawings wherein:

FIG. 2 is a cross-sectional view of a blocking element for a plug-safety coupling in accordance with one embodiment of this invention;

FIG. 2a is a cross-sectional view of a plug for a plug-type safety coupling in accordance with one embodiment of this invention;

FIG. 2b is a top view of the housing shown in FIG. 1 for a plug-type safety coupling in accordance with one embodiment of this invention;

FIG. 4 is a side view of a housing for a plug-type safety coupling in accordance with one embodiment of this invention;

FIG. 4a is a cross-sectional view along line A—A of the housing shown in FIG. 4;

FIG. 4b is an enlarged view of a portion of the housing shown in FIG. 4a showing details of a bolt employed for retaining the blocking element within the housing of a plug-type safety coupling in accordance with one embodiment of this invention;

DESCRIPTION OF PREFERRED EMBODIMENTS

Figure 1:
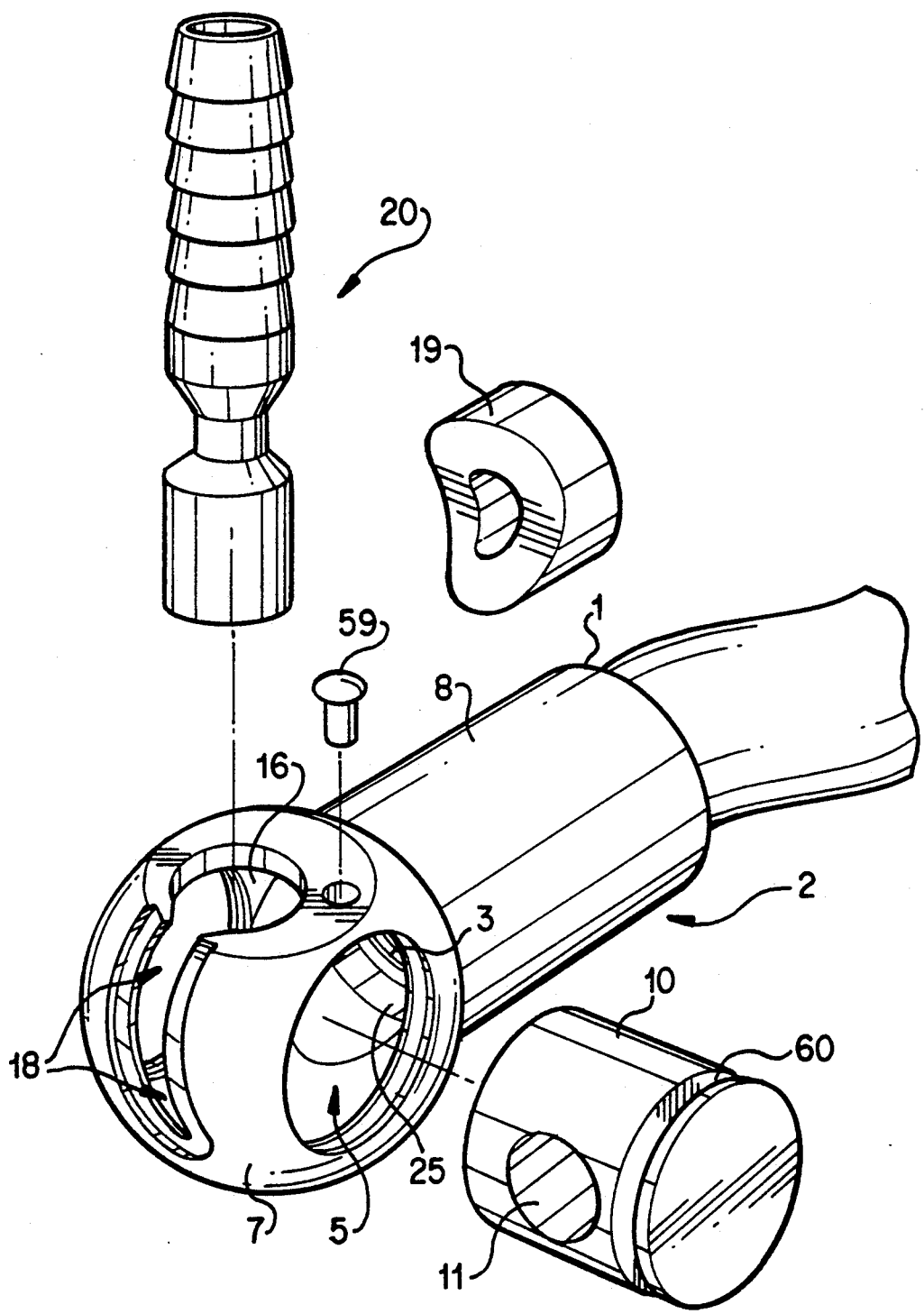
FIG. 1 is a perspective view of a plug-type safety coupling in an exploded view in accordance with one embodiment of this invention.

As shown in FIG. 1, a plug-type safety coupling for pressure lines in accordance with one embodiment of this invention comprises plug (20) and a housing (2) for a coupling barrel (1). Housing (2) is produced in one piece and has an essentially spherical or round element (7) and a cylindrical element (8). In accordance with one embodiment of this invention, cylindrical element (8) incorporates a threaded hole (3) making it possible to screw coupling barrel (1) onto the nipple of a hose or tube end piece. It will also be apparent that cylindrical element (8) can be provided with an external tread for screwing into a bushing or coupler on the end piece of a hose or tube. Round element (7) is provided with bore (5) transverse to the longitudinal axis of cylindrical element (8) and adapted to receive blocking element (10) which is sealably mounted and secured within housing (2). Blocking element (10), sealably mounted and secured within housing (2), is rotatable between a blocking position and a working position. To permit rotation of blocking element (10), round element (7) is provided with elongated slot (18) which extends approximately 90° around the axis of bore 5 and forms a larger opening (16) in housing (2) which serves as a receptacle for plug (20) in the blocked position of blocking element (10).

In accordance with one embodiment of this invention, blocking element (10) is cylindrical in shape. In accordance with another embodiment of this invention, blocking element (10) is slightly conical in shape. Blocking element (10) is provided with a straight line bore (11) or a curved line bore (46) passing therethrough, said bore (11, 46) forming a bush (51) for receiving plug (20).

As shown in FIG. 2, bush (51) comprises two sequential axial borings (52,53) having different diameters. Material surrounding smaller diameter axial boring (53) forms annular groove (54) in communication with said larger diameter axial boring (52). Annular groove (54) enclosing nipple (57) is adapted to receive plug (20) whereby a seal between plug (20) and bush (51) is formed. In particular, seal (55) between plug (20) and bush (51) is disposed between outer surface (56) of nipple (57) and inner side surface (58) of plug (20). Blocking element (10) is sealed against housing (2) by a loop seal (19,43,47) having at least one loop, said loop seal (19,43,47) disposed within a corresponding groove (25,34,42) in the surface of blocking element (10) or in the inner surface of housing (2).

Round element (7) of housing (2) is flattened parallel to the radial plane of opening (16). On the side of housing (2) opposite opening (16), round element (7) is also flattened. Because of these flattened surfaces, coupling barrel (1) can be screwed tightly onto a tube nipple with a wrench. In addition, within the interior of round element (7) of housing (2) there is provided a blind hole (25) aligned with the axis of cylindrical element (8). Blind hole (25) is of greater diameter than elongated slot (18) and threaded hole (3). For this reason, it must be milled or turned out. In accordance with one embodiment of this invention, blind hole (25) accommodates sealing element (19). Sealing element (19) is essentially in the form of a hollow cylinder on one end having an outer side that is curved concavely in one direction so that it lies snugly against the inserted blocking element (10). In accordance with another embodiment of this invention, blind hole (25) is omitted and blocking element (10) is sealed by loop seals (43,47) shown in FIG. 5.

In accordance with one embodiment of this invention, groove (34) on the surface of blocking element (10) consists of two annular grooves (35,36) having a common piece. One of said annular grooves (35,36) surrounds the opening of straight line bore (11) whereas the other annular groove (35,36) is adjacent in a peripheral direction to annular groove (35) and, as previously stated, has a common piece therewith. Loop seal (47) is installed in annular groove (34), fitting exactly therein. In this manner, the connection between straight line bore (11) and blind hole (25) is effectively sealed when blocking element (10) is in the working position. On the other hand, in each position of blocking element (10) which deviates from the working position, blind hole (25) is sealed.

In accordance with one embodiment of this invention, blocking element (10) is secured in housing (2) by score-nail (59) which passes through housing (2) and extends into circumferential groove (60) extending around blocking element (10).

In accordance with another embodiment of this invention, in particular, plug-type safety couplings for use in very high pressure systems or systems having large diameters, blocking element (10) is securable in housing (2) in different swivel positions by bolt (61) pushable into housing (2) against the force of spring (62). Bolt (61) is provided with thickened end (63) which fits into groove (64) in blocking element (10), groove (64) extending around a swivelable angle along the circumference of blocking element (10) and having recesses (65) in a radial direction with respect to blocking element (10) at each swivelable position where blocking element (10) is to be secured as shown in FIGS. 4, 4a and 4b. Thickened end (63) of bolt (61) snaps into recesses (65) thereby rendering blocking element (10) no longer swivelable.

To release blocking element (10), bolt (61) is pushed into housing (2) using the thumb of one hand while force is applied to plug (20) by the other hand.

In accordance with one embodiment of this invention, blocking element (10) is provided with a plurality of release ports (66) said release ports leading from a flat side of blocking element (10) to an inner side of annular groove (54) as shown in FIG. 2. Thus, as plug (20) is removed from bush (51), any pressure remaining in the coupling is released through release port (66).

Figure 3B:
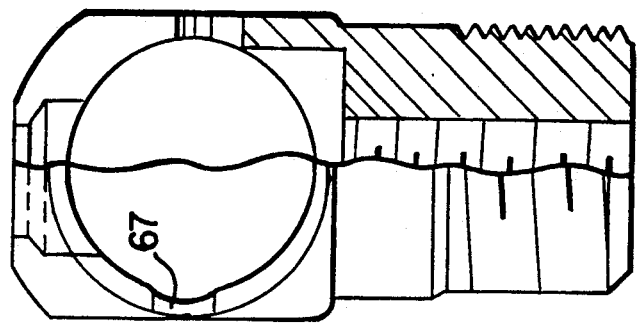
FIG. 3b is a diagram of yet another embodiment of a housing for a plug-type safety coupling in accordance with another embodiment of this invention.
Figure 3A:
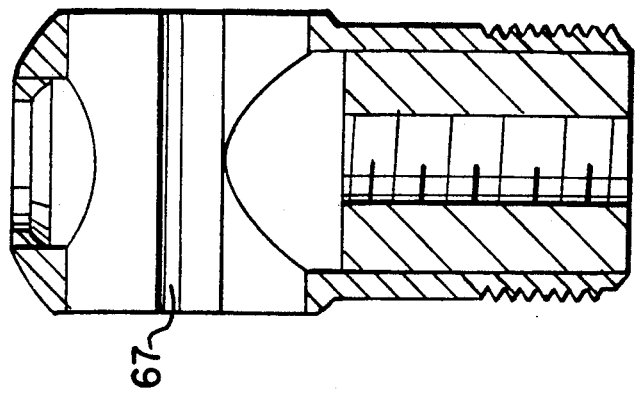
FIG. 3a is a diagram of a housing for a plug-type safety coupling in accordance with another embodiment of this invention.
Figure 3:
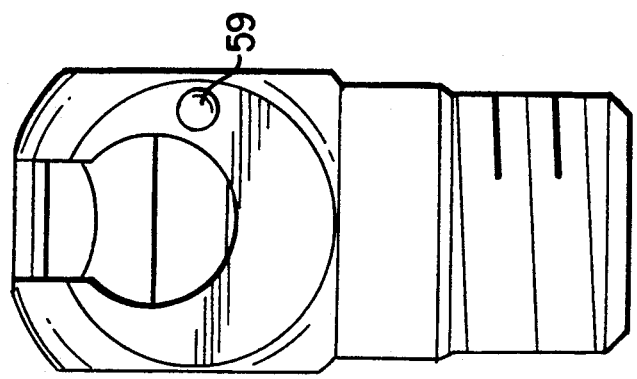
FIG. 3 is a diagram of a housing for a plug-type safety coupling in accordance with one embodiment of this invention.

In accordance with another embodiment of this invention, housing (2) is provided with a release port in the form of groove (67) disposed in an axial direction in the inner surface of housing (2) as shown in FIGS. 3, 3a, and 3b.

Figure 6:
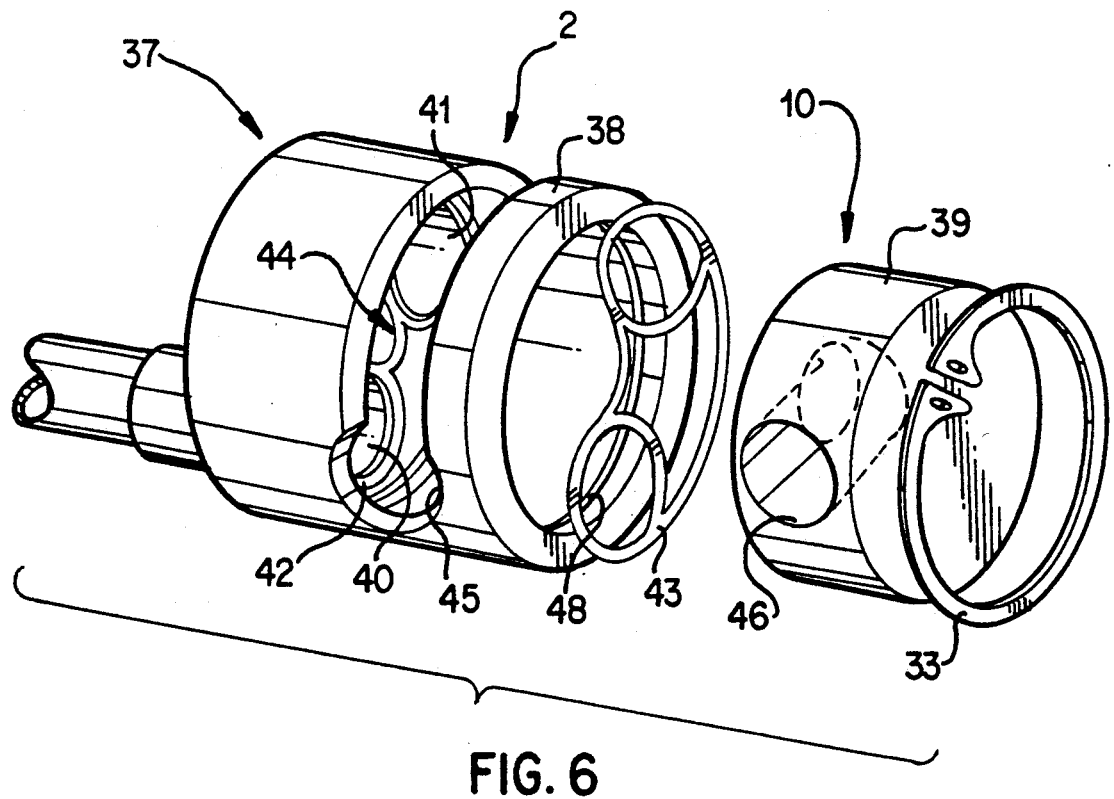
FIG. 6 is a diagram of a safety coupling for use under particularly high pressure in perspective, in an exploded view.

FIG. 6 shows an exploded view of another embodiment of this invention also particularly suited for high pressure and larger line diameters. In accordance with this embodiment, coupling barrel (1) comprises an essentially cylindrical housing (37), approximately one-half of which is machined out to form hollow cylinder (38), and cylindrical shaped part (39) which fits into the interior of hollow cylinder (38). Housing (37) is provided with bore (40) and a feed line and additional bore (41) which functions as a release port. Bores (40,41) both extend in a direction parallel to the axis of hollow cylinder (38). The centers of bores (40,41) are equidistant from the axis of hollow cylinder (38) resulting in disposition of bores (40,41) on a circle which is concentric relative to the axis of hollow cylinder (38). The opening of bore (40), which serves as a feed line, is surrounded by annular groove (42) which communicates with another annular groove around the outlet of release bore (41). This is accomplished by an annular groove which encircles both annular grooves but which, as discussed above, communicates with both annular grooves, even though this is not absolutely essential. Bore (40) is threaded which makes is possible to screw coupling barrel (1) onto the nipple of a feed line.

Hollow cylinder (38) of cylindrical housing (37) is provided with elongated slot (44) in its outer casing which extends along a peripheral direction of hollow cylinder (38). At one end, elongated slot (44) forms hole (45) having a somewhat larger diameter than the width of elongated slot (44). Relative to the axis of cylinder (38), elongated slot (44) extends through an angle of rotation which corresponds to the angle between the centers of bore (40) and release bore (41).

Cylindrical shaped part (39) incorporates a curved hole (46) that comprises a bore in the radial plane and a bore in the axial direction, both of which communicate with each other. The bore that extends in the radial plane is configured similar to straight line bore (11) in blocking element (10) as shown in FIG. 1 and is adapted to accommodate plug (20). Cylindrical shape part (39) is secured in its position in the interior of hollow cylinder (38) when inserted by means of safety ring (33) but remaining rotatable therein. To this end, safety ring (33) is inserted into groove (48) in the inner side of hollow cylinder (38). The safety coupling shown in FIG. 6 can be produced in a particularly simple manner and can be made large without any problem. It is, of course, understood that at high pressures and large line diameters, the force necessary to rotate blocking element (39) increases proportionally. This is remedied by an axial pressure bearing between blocking element (39) and safety ring (33) which greatly reduces frictional forces of blocking element (39) on safety ring (33). In addition, on its side that remains free, blocking element (10) is provided with a lever to assist in locking and unlocking. These means to assist rotation can also be in the form of a rotation shaft that extends in an axial direction and which is provided with a handle.

Figure 5:
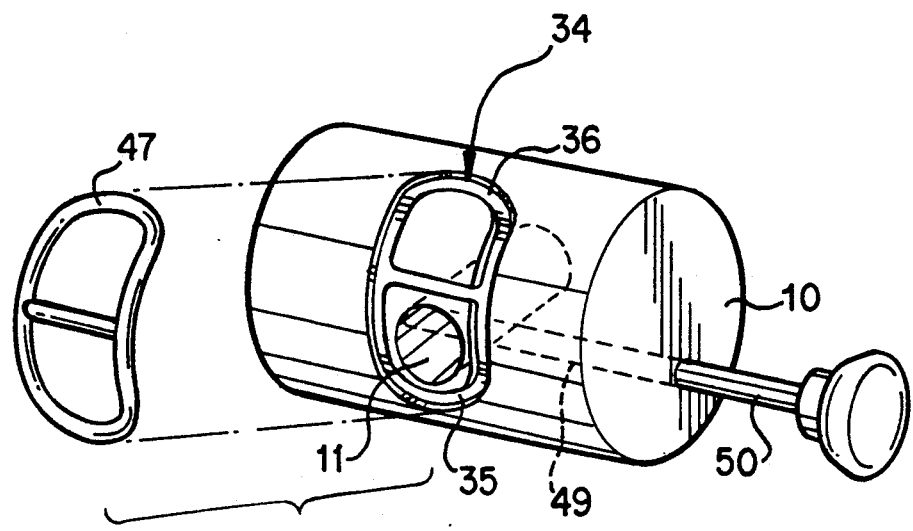
FIG. 5 is a diagram of a blocking element with a special seal in accordance with one embodiment of this invention.

A further problem which may occur in high pressure systems or large line diameter systems is the rapidly increasing force which is needed to keep the plug pressed in as it is rotated in the blocking element. This inward force is necessary to release plug (20) from its detent, which then permits this rotation. In the case of smaller versions of coupling barrel (1), and at pressures on the order of only a few bars, plug (20) can easily be pressed in against the existing pressure and, if necessary, against the force of a suitable spring and then into blocking element (10), and thus moved out of its detent. However, this becomes a problem for operating the safety coupling in high pressure systems and/or with systems having large line diameters. This is remedied by blocking element (10) having bore (49) which intersects in part bore (11) which accommodates plug (20) perpendicular to the axis of bore (49), as shown in FIG. 5. Safety pin (50) is inserted into bore (49) such that, when plug (20) is fully inserted, safety pin (50) engages a special annular groove in plug (20), securing plug (20) therein. Plug (20) can then be rotated by hand without having to be constantly pressed into blocking element (10).

While in the foregoing specification this invention has been described in relation to certain preferred embodiments thereof, and many details have been set forth for purpose of illustration, it will be apparent to those skilled in the art that the invention is susceptible to additional embodiments and that certain of details described herein can be varied considerably without departing from the basic principles of the invention.

I claim:

1. A plug-type safety coupling for pressure lines comprising: a plug (20) and a coupling barrel (1) having a housing (2;37), a blocking element (10) sealably mounted and secured within said housing (2;37), said blocking element (10) rotatable between a blocking position and a working position, said housing (2;37) comprising a one-piece shaped part that can be screwed on to a pressure line end piece, said blocking element (10) having a bore (11,46) passing through it, said bore (11;46) forming a bush (51) for the plug (20), said bush (51) comprising two sequential axial borings (52,53) with different diameters, and forming an annular groove (54) surrounding said smaller diameter axial boring (53) in communication with said larger diameter axial boring (52), said plug (20) sealably fitting into said annular groove (54), a seal (55) between said plug (20) and said bush (51) disposed between an outer surface (56) of a nipple (57) enclosed by the annular groove (54) and an inner side surface (58) of the plug (20), and said blocking element (10) sealed against the housing (2;37) by means of a loop seal (19;43;47) having at least one loop, said loop seal disposed within a corresponding groove (25;34;42) in one of the surface of the blocking element (10) and the inner surface of the housing (2;37).

2. A plug-type safety coupling for pressure lines according to claim 1, wherein the loop seal (43;47) comprises a plurality of loops and is disposed in one of a blocking element groove (34) in the blocking element (10) and a housing groove (42) in the housing (2;37).

3. A plug-type safety coupling for pressure lines according to claim 1, wherein the blocking element (10) is securable in different swivel-positions by a bolt (61) pushable into the housing against the force of a spring (62), said bolt (61) having a thickened end (63) which fits into a respective circular groove (64), said respective circular groove (64) extending around a swivelable angle along the circumference of the blocking element (10) and having a recess (65) in a radial direction with respect to said blocking element (10) at each position where the blocking element (10) is bolted, said thickened end (63) of the bolt (61) snapping into said recess (65) rendering the blocking element (10) no longer swivelable.

4. A plug-type safety coupling for pressure lines according to claim 1, wherein said blocking element (10) forms a plurality of release ports (66), said release ports leading from a flat outside of the blocking element (10) to an inner side of the annular groove (54).

5. A plug-type safety coupling for pressure lines according to claim 1, wherein the housing (2) forms a housing release port in the form of a housing groove (67) disposed in an axial direction in the inner surface of the housing (2).

6. A plug-type safety coupling for pressure lines according to claim 1, wherein an axial pressure bearing is located between the blocking element (39) and a safety ring (33) to reduce frictional forces.

7. A plug-type safety coupling for pressure lines according to claim 1, wherein the blocking element (10) forms a drilling (49) that intersects said bore (11,46) accommodating the plug (20) perpendicular to the axis of said drilling, said drilling adapted to receive a safety pin (50) which engages said annular groove in the plug (20) and secures it in a position.

8. A plug-type safety coupling for pressure lines according to claim 1, wherein said blocking element (10) is a cylindrical blocking element and said bore (11) is a straight line bore.

9. A plug-type safety coupling for pressure lines according to claim 1, wherein said blocking element (10) is a cylindrical blocking element and said bore (11) is a curved line bore.

10. A plug-type safety coupling for pressure lines according to claim 1, wherein said blocking element (10) is a conical blocking element and said bore (11) is a straight line bore.

11. A plug-type safety coupling for pressure lines according to claim 1, wherein said blocking element (10) is a conical blocking element and said bore (11) is a curved line bore.

12. A plug-type safety coupling for pressure lines according to claim 10, wherein the blocking element groove (34) comprises a first annular-groove (35) around a mouth of the straight line bore (11) and, in the direction of the circumference of the blocking element, a second annular-groove (36) having a common part with the first annular-groove (35), wherein a corresponding loop seal (47) is disposed within said blocking element groove (34).

13. A plug-type safety coupling for pressure lines according to claim 9, wherein the cylindrical blocking element (10) is secured by a score-nail (59) extending through the housing (2) and into a respective circular groove (60) which extends around the cylindrical blocking element (10).

14. A plug-type safety coupling for pressure lines according to claim 8, wherein the loop seal (43;47) comprises a plurality of loops and is disposed in one of a blocking element groove (34) in the blocking element (10) and a housing groove (42) in the housing (2;37).

15. A plug-type safety coupling for pressure lines according to claim 8, wherein the blocking element groove (34) comprises a first annular-groove (35) around a mouth of the straight line bore (11) and, in the direction of the circumference of the blocking element, a second annular-groove (36) having a common part with the first annular-groove (35), wherein a corresponding loop seal (47) is disposed within said blocking element groove (34).

16. A plug-type safety coupling for pressure lines according to claim 8, wherein the cylindrical blocking element (10) is secured by a score-nail (59) extending through the housing (2) and into a respective circular groove (60) which extends around the cylindrical blocking element (10).

17. A plug-type safety coupling for pressure lines according to claim 14, wherein the blocking element groove (34) comprises a first annular-groove (35) around a mouth of the straight line bore (11) and, in the direction of the circumference of the blocking element, a second annular-groove (36) having a common part with the first annular-groove (35), wherein a corresponding loop seal (47) is disposed within said blocking element groove (34).

18. A plug-type safety coupling for pressure lines according to claim 17, wherein the cylindrical blocking element (10) is secured by a score-nail (59) extending through the housing (2) and into a first respective circular groove (60) which extends around the cylindrical blocking element (10).

19. A plug-type safety coupling for pressure lines according to claim 18, wherein the blocking element (10) is securable in different swivel-positions by a bolt (61) pushable into the housing against the force of a spring (62), said bolt (61) having a thickened end (63) which fits into a second respective circular groove (64), said second respective circular groove (64) extending around a swivelable angle along the circumference of the blocking element (10) and having a recess (65) in a radial direction with respect to said blocking element (10) at each position where the blocking element (10) is bolted, said thickened end (63) of the bolt (61) snapping into said recess (65) rendering the blocking element (10) no longer swivelable.

20. A plug-type safety coupling for pressure lines according to claim 19, wherein said blocking element (10) forms a plurality of release ports (66), said release ports leading from a flat outside of the blocking element (10) to an inner side of the annular groove (54).

21. A plug-type safety coupling for pressure lines according to claim 20, wherein the housing (2) forms a housing release port in the form of a housing groove (67) disposed in an axial direction in the inner surface of the housing (2).

22. A plug-type safety coupling for pressure lines according to claim 21, wherein an axial pressure bearing is located between the blocking element (39) and a safety ring (33) to reduce frictional forces.

23. A plug-type safety coupling for pressure lines according to claim 22, wherein the blocking element (10) forms a drilling (49) that intersects said bore (11,46) accommodating the plug (20) perpendicular to the axis of said drilling, said drilling adapted to receive a safety pin (50) which engages said annular groove in the plug (20) and secures it in a position.

* * * * *